(12) United States Patent
Kamal et al.

(10) Patent No.: US 9,125,004 B2
(45) Date of Patent: Sep. 1, 2015

(54) GROUP SHARING USING NEAR FIELD COMMUNICATION (NFC)

(75) Inventors: Mohammad Ashfaq Kamal, King of Prussia, PA (US); Rita Sadhvani, Watchung, NJ (US); Hannah Y. Moon, Boston, MA (US)

(73) Assignee: Cellco Partnership, Basking Ridge, NJ (US)

( * ) Notice: Subject to any disclaimer, the term of this patent is extended or adjusted under 35 U.S.C. 154(b) by 155 days.

(21) Appl. No.: 13/485,366

(22) Filed: May 31, 2012

(65) Prior Publication Data

US 2013/0324169 A1 Dec. 5, 2013

(51) Int. Cl.
*H04W 4/00* (2009.01)
*H04W 4/02* (2009.01)
*H04W 4/08* (2009.01)

(52) U.S. Cl.
CPC .............. *H04W 4/008* (2013.01); *H04W 4/02* (2013.01); *H04W 4/08* (2013.01)

(58) Field of Classification Search
CPC .................................. H04W 4/14; H04W 4/12
USPC ......................................................... 455/466
See application file for complete search history.

(56) References Cited

U.S. PATENT DOCUMENTS

| | | | |
|---|---|---|---|
| 2004/0128324 A1* | 7/2004 | Sheynman et al. | 707/200 |
| 2006/0095531 A1* | 5/2006 | Cho | 709/207 |
| 2007/0016650 A1* | 1/2007 | Gilbert et al. | 709/207 |
| 2007/0208782 A1* | 9/2007 | Carter et al. | 707/201 |
| 2008/0016160 A1* | 1/2008 | Walter et al. | 709/206 |
| 2008/0090553 A1* | 4/2008 | Wan et al. | 455/413 |
| 2008/0208963 A1* | 8/2008 | Eyal et al. | 709/203 |
| 2009/0202250 A1* | 8/2009 | Dizechi et al. | 398/107 |
| 2010/0054148 A1* | 3/2010 | Murakami et al. | 370/252 |
| 2011/0028083 A1* | 2/2011 | Soitis | 455/3.06 |
| 2011/0105131 A1* | 5/2011 | Shaheen | 455/445 |

OTHER PUBLICATIONS

Frequently Asked Questions: The Bump App for iPhone and Android, Bump Technolgies, Inc., retrieved May 30, 2012. <http://bu.mp/company/faq>.
"Introducing Android 4.0," Android-Introducing Ice Cream Sandwich, retrieved May 30, 2012. <http://www.android.com/about/ice-cream-sandwhich/>.
Connection Handover: Technical Specification, NFC Forum™, Connection Handover 1.2, Jul. 7, 2010.

* cited by examiner

*Primary Examiner* — Lester Kincaid
*Assistant Examiner* — Andy Gu

(57) ABSTRACT

The sharing of content from one mobile station with a group of mobile stations using near-field communication (NFC) may be initiated, for example, by the one mobile station establishing a NFC link with another mobile station. The one mobile station verifies that the linked mobile station is part of the group, and transmits information regarding the content to be shared to the linked mobile station using NFC. The one mobile station uploads the content to a server using the mobile communication network, such that the content can be retrieved from the server via the mobile communication network by all other mobile stations in the group. The one mobile station or the server can send a notification to the other mobile stations in the group including information for retrieving the uploaded content.

22 Claims, 7 Drawing Sheets

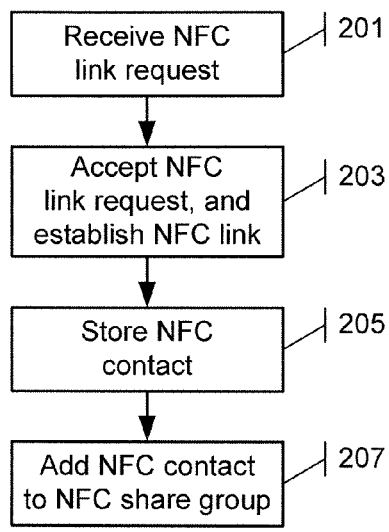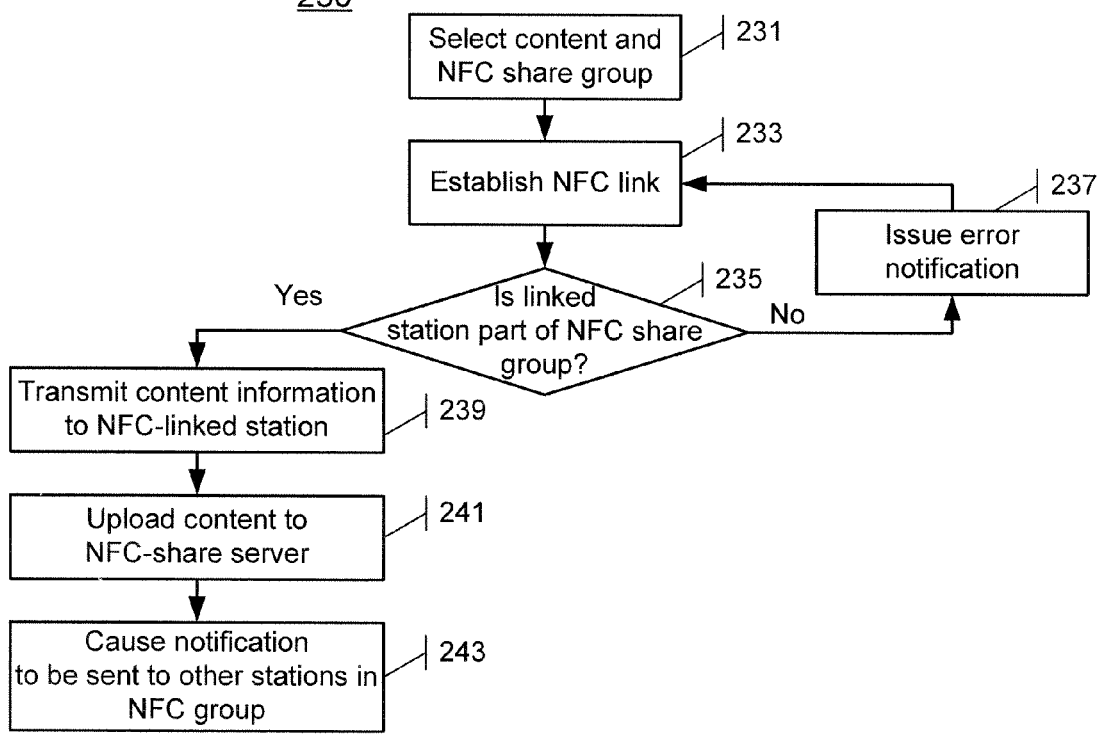

GROUP SHARING USING NEAR FIELD COMMUNICATION (NFC)

BACKGROUND

In recent years, the processing and communication capabilities of mobile stations (and other mobile communication devices) have expanded and thereby enabled mobile stations to communicate using multiple different types of transceivers, networks, and protocols. Mobile stations are no longer just capable of mobile wireless communications through mobile communication networks. Recently, at least some mobile stations have also been configured for direct communication with other properly equipped mobile stations and devices using near field communication (NFC) technology.

The improvements in mobile stations' processing and communication capabilities have led the stations to increasingly be used to retrieve, access, create, and transmit content. In particular, content is increasingly being shared between mobile stations. The content is generally shared from one mobile station with a particular other mobile station, or with a group of mobile stations. The sharing of content between mobile stations, however, is predominantly done indirectly through the mobile communication network using email and web-based sharing.

NFC technology can be used by two mobile stations to communicate directly with each other, and to share content with each other. NFC technology, however, has a very limited range which only enables a mobile station to communicate with another mobile station located in close proximity (e.g., within a few centimeters). As a result, when used to share content with other mobile stations, NFC technology may be limited to sharing content with a single other mobile station at a time. A need therefore exists for systems and methods for enabling group sharing of content to multiple mobile stations using near field communications.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is an exemplary flow diagram of a method for adding a mobile station (MS) to a NFC share group, so as to define the NFC share group.

FIG. 2B is an exemplary flow diagram of a method for sharing content from a MS with a NFC-share group.

DETAILED DESCRIPTION

Figure 1:
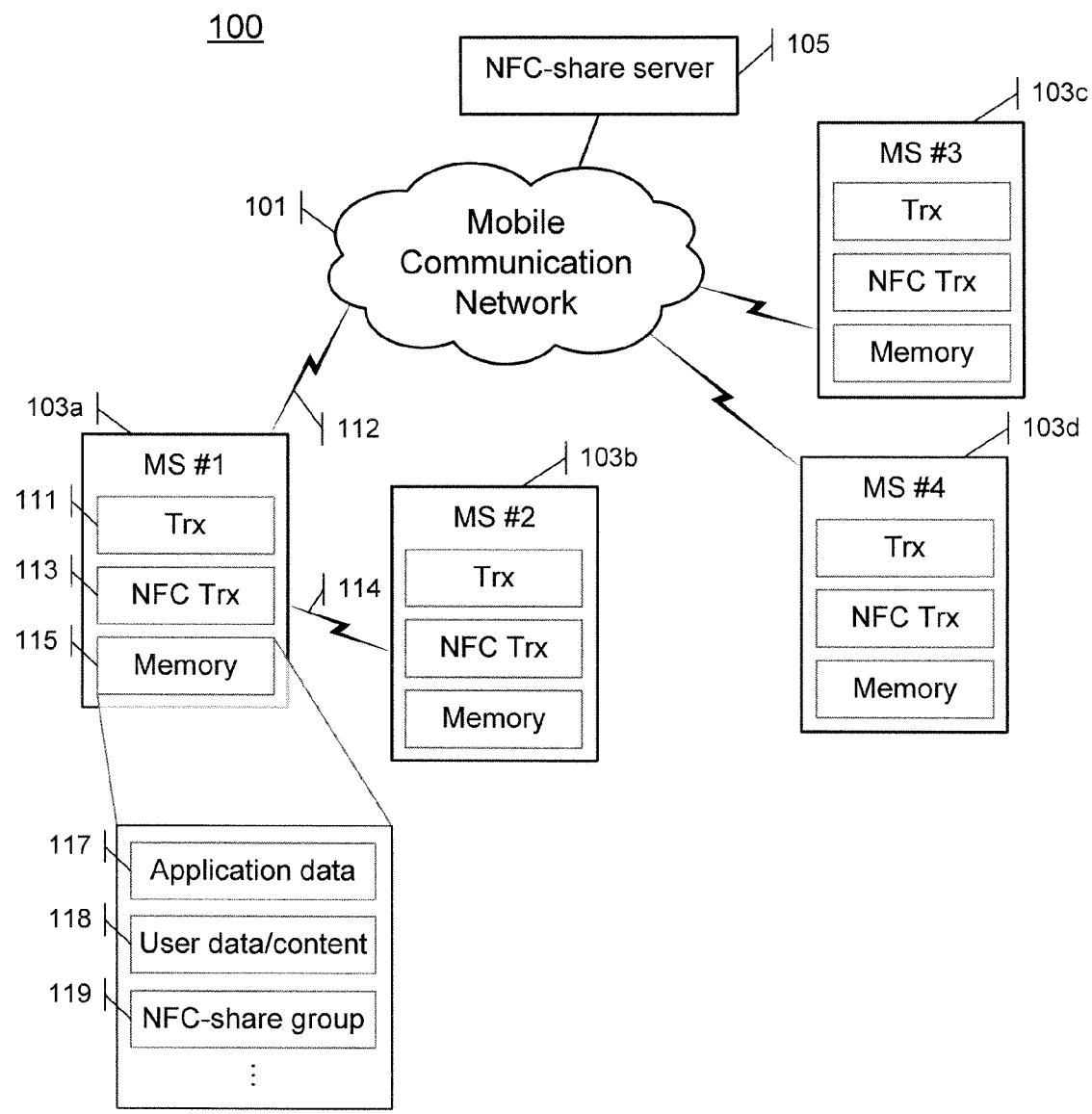
FIG. 1 is a general block diagram of a system for providing group sharing of content using near field communication (NFC).

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to the sharing of content from one mobile station with a group of mobile stations, based at least in part on near field communication (NFC).

A mobile station is operative to communicate with other mobile stations through a mobile communication network. The mobile station is further equipped with a NFC transceiver and is operative to communicate using NFC with any other NFC-enabled mobile station when located within the station's close proximity. A user of the mobile station also can define a NFC-share group of NFC-enabled mobile stations with which content should be shared throughout the group whenever the content is shared, using NFC, with any of the mobile stations in the group.

In an exemplary operation, content is shared with the mobile stations in the NFC-share group by selecting an option on the mobile station to share the content with the group, and by establishing a communication using NFC between the mobile station and a first mobile station in the group. In response to establishing the communication using NFC, the mobile station determines whether the first mobile station is part of the group and, if so, transmits to the first mobile station information relating to the content using NFC. The mobile station further transmits the content through the mobile communication network for upload to a NFC-share server, and causes a notification to be sent, through the mobile communication network to all mobile stations in the NFC-share group other than the first mobile station, to retrieve the content from the NFC-share server.

In one example, in response to establishing the communication using NFC, the mobile station transmits, using NFC, the content to the first mobile station. In another example, in response to establishing the communication using NFC, the mobile station transmits using NFC to the first mobile station a notification to retrieve the content from the NFC-share server.

In one example, the mobile station causes the notification to be sent by transmitting the notification from the mobile station through the mobile communication network to all mobile stations in the NFC-share group other than the first mobile station, for example using a mobile messaging service (MMS) message. In another example, the mobile station causes the notification to be sent by configuring the NFC-share server to transmit the notification through the mobile communication network to all mobile stations in the NFC-share group other than the first mobile station, for example using packet-based communication.

Reference now is made in detail to the examples illustrated in the accompanying drawings and discussed below. FIG. 1 provides a general block diagram of a system for providing group sharing of content using near field communication.

The system 100 of FIG. 1 includes a mobile communication network 101 and a plurality of mobile stations (MS) 103a-d configured to communicate through the network 101 with each other, with other MSs or communication terminals, and/or with servers connected to the communication network

101. The system 100 also includes application servers connected to the mobile communication network 101 for providing application services to MSs communicating through the network, such as a NFC-share server 105 used for providing the sharing of content between groups of MSs operable through the network 101. Further components of the system 100 are shown and described in more detail in relation to FIG. 5.

Each mobile station (MS) of the mobile stations 103a-d (referenced generally herein as mobile station(s) 103) includes a transceiver 111, a NFC transceiver 113, and at least one memory 115. The transceiver 111 provides wireless communication between the MS 103 through the mobile communication network 101, including mobile voice and data communications to/from the MS and network. The NFC transceiver 113 provides near field communication between the MS 103 and one or more NFC-enabled devices located in close proximity to the MS 103, such as other NFC-enabled MSs (e.g., MSs located within a range of NFC communications to/from the MS 103, such as a range of up to a few centimeters). The memory 115 stores application data 117 including executable instructions for use in executing programs on the MS 103. The memory also stores user data and user content 118, including user preference and settings data for use by applications during execution, and content stored by a user on the MS 103. Content can include contacts or other address book data; images, audio or video recordings, or files; application settings or user settings, or the like. The user content 118 may be accessible by a user for retrieval on the MS 103 and for sharing from the MS 103 with other MSs. The memory 115 may further store NFC-share data, including NFC-share group data 119 for storing one or more lists of MSs included in NFC-share groups. In some examples, the memory stores information for a single NFC-share group; in other examples, the memory stores information for multiple different NFC-share groups.

Each NFC-enabled MS 103 is capable of at least two types of wireless communications. The MS 103 is configured for near field communication using the NFC transceiver 113, and can thus establish NFC communication links 114 with other NFC-enabled communication devices. The MS 103 can send and receive, using NFC, control data for establishing a communication link (e.g., a NFC communication link), as well as user content or data for sharing with other MSs or devices. The MS 103 is further configured for mobile wireless communications using transceiver 111, and can thus establish mobile wireless communication links 112 with the mobile traffic network 101 (and/or with infrastructure of the mobile traffic network 101, such as one or more base stations of the network). The MS 103 can send and receive voice, data, and other communications to/from mobile traffic network 101 using mobile communications technologies and protocols.

The mobile communication network 101 may also provide the mobile stations 103 with communicative access to one or more application servers such as NFC-share server 105. The NFC-share server 105 includes storage for content being shared between multiple MSs in a NFC-share group. In particular, the NFC-share server 105 may be configured to store content uploaded by one MS 103a for retrieval by one or more other MSs (e.g., MSs 103c, 103d) that are part of a NFC-share group.

The system 100 of FIG. 1 can be used to provide group sharing of content between mobile stations 103 using near field communication. The group sharing of content is described in more detail below in relation to the flow diagrams of FIGS. 2A and 2B.

FIG. 2A shows an exemplary flow diagram of a method 200 for adding a MS to a NFC share group, so as to define the NFC share group. A NFC share group is a group of two or more mobile stations 103. A NFC share group can be used to automatically share content with all mobile stations in the group using a single user operation. For example, whenever content is shared with a MS in a NFC share group using near field communication, the content may automatically be shared with all other mobile stations in the NFC share group. Information for a NFC share group (e.g., NFC share group data 119 of FIG. 1) generally includes a list of MSs that form part of the group, each MS in the list being identified by a unique identifier for the MS.

The method 200 begins in step 201 with a mobile station (e.g., receiving MS 103b of FIG. 1) receiving, in a near field communication received from another mobile station (e.g., sending MS 103a of FIG. 1), a request to establish a NFC link through the MS's NFC transceiver 113. The received request can include an identifier for the MS having sent the request, such as a NFC identifier. The NFC identifier for a mobile station generally is a unique identifier uniquely identifying the mobile station for NFC-based communications. The NFC identifier can be the same as an identifier used to uniquely identify the mobile station for mobile communication in a mobile communication network (e.g., an international mobile subscriber identification number (IMSI), a mobile directory number (MDN), universal integrated circuit card (UICC) identifier, or the like), a hardware identifier or other device identifier (e.g., a mobile equipment identifier (MEID), an identifier related to the NFC transceiver 113, or the like), or another appropriate identifier. The received request may optionally include communications or other parameters for facilitating the establishment of a NFC communication link between the MSs. In order to receive and process the NFC link request, the MS 103b may have a NFC application running on a processor and used to operate the NFC transceiver 113 and monitor received near field communications for incoming requests.

In response to receiving the NFC link request, the receiving MS 103b determines whether or not to accept the link request in step 203, and selectively establishes a near field communication link based on the determination. In response to receiving the NFC link request, the receiving MS 103b retrieves the received NFC identifier from the request, and determines whether or not to accept the request based on the NFC identifier (e.g., if the NFC identifier corresponds to a previously authorized identifier, the request may be automatically accepted; if the NFC identifier corresponds to a previously blocked identifier, the request may be automatically blocked). Additionally or alternatively, the receiving MS 103b may prompt a user to determine whether a communication link should be established. If it is determined that the link request should be accepted, the MS 103b establishes a near field communication link with the sending MS 103a by sending a NFC link response message including the receiving MS's NFC identifier (i.e., the NFC identifier for receiving MS 103b) and communication parameters for establishing the NFC link.

Once a near field communication link is established between the receiving and sending MSs 103b and 103a, information can be exchanged (i.e., transmitted and received) between the mobile stations over the communication link. In one example, a user of either one of the MSs may send content or information, e.g. contact information such as an electronic business card, from the user's MS to the connected MS. Upon receiving the content or information, the connected MS prompts a user whether or not to accept, display, and/or store the received content on the connected MS.

In response to establishing the NFC link with the other MS, and/or in response to receiving contact information from the other MS, a MS store NFC contact information for the connected MS in step 205. The NFC contact information includes information received from the other MS, such as the NFC identifier for the MS with which the NFC link is established. The NFC contact information may be stored in a dedicated storage for NFC contact information, or the NFC contact information can be stored with other contact information stored on the MS, such as in an address book of the MS. The NFC contact information can include any additional received contact information, such as one or more names, addresses, phone numbers, addresses (e.g., IP, e-mail, web or URL), identifiers (e.g., usernames or identifiers for services), or the like, which are associated with the MS from which the NFC contact information is received. The additional received contact information may be received from the other MS, and may be associated with the other MS's contact information based on having been received therefrom. Alternatively or additionally, the additional received contact information may be retrieved, from a storage or remote server storing additional contact information associated with mobile stations, based on the other MS's identity (e.g., based on the received NFC identifier for the other MS). In another example, the additional received contact information may include contact information manually retrieved or entered by a user of the MS, and which is manually associated with the NFC contact information by a user of the MS.

In step 207, a user of the MS 103 may add a stored NFC contact to a NFC-share group. The user may add the NFC contact to the group by selecting the contact on the MS, and by selecting on option to associate with the contact with a NFC-share group. The MS may then store, in a memory 115 storing user and/or application data, information 119 for the NFC-share group including a record associating the selected contact with the NFC-share group. In some examples, a stored NFC contact may be automatically associated with a NFC-share group. For instance, at the time of creating and storing a new NFC contact on a MS 103, the new NFC contact may automatically be associated with a default NFC-share group on the MS 103. Alternatively, at the time of creating and storing the new NFC contact, the new NFC contact may be automatically associated with a particular NFC-share group based on the contact information associated with the new NFC contact. For instance, if the contact information associated with the new NFC contact identifies the contact as being a "friend" or a "family" member, the new NFC contact may be automatically associated with a corresponding NFC-share group with which other contacts identified as being "friend [s]" or "family" members are associated.

The method 200 has been described in the context of a MS 103b receiving a NFC link request in step 201, and accepting the NFC link request in step 203. More generally, however, the method 200 for adding a NFC contact to a NFC-share group can also be used in the context of a MS 103 having initiated the establishment of a NFC link by transmitting a NFC link request (such as the NFC link request received in step 201). For example, a user of a MS 103a may select an option on the MS to establish a NFC link (e.g., such as an option to share content using NFC, which may cause the MS to attempt to establish a NFC link), thereby causing the MS 103a to transmit a request to establish a NFC link through the MS's NFC transceiver 113. If a NFC-enabled device is within NFC transmission range of the MS 103a, the transmitted request can be received by the device. Following the transmission of the request, the MS 103a may wait for reception of a NFC link response message. If and when a NFC link response message is received, the MS 103a can establish a near field communication link with the responding MS and proceed to steps 205 and 207 to add an NFC contact corresponding to the responding/connected MS to a NFC-share group. Alternatively, if and when a NFC link response message is received from a responding MS, the MS 103a may retrieve the NFC identifier for the responding MS from the response message, determine whether or not to establish a link (e.g., based on determinations and/or prompts such as those described in relation to step 203 above), and establish the communication link based on the determination prior to proceeding to step 205 and 207.

The method 200 describes steps involved in adding a MS 103b to a NFC share group by establishing a NFC link with the mobile station. More generally, however, a user can add a MS 103b to a NFC share group by providing a NFC identifier for the mobile station to be added, and by selecting a NFC share group to which the identifier should be added. Thus, a user can add a MS 103b to a NFC share group without establishing a NFC link with the MS 103b. Additionally, the method 200 describes steps involved in adding a MS 103b to a NFC share group, wherein the MS 103b is an NFC-enabled mobile station. In general, mobile stations can only be added to or form part of a NFC share group if the mobile stations are NFC-enabled. In some examples, however, mobile stations that are not NFC-enabled can be added to a NFC-share group by adding an identifier for the mobile station (e.g., a MDN for the mobile station) to the NFC share group. In some examples, other types of contacts can be added to a NFC-share group, such as email or other addresses to which content should be transmitted as part of a NFC-group sharing operation.

FIG. 2B shows an exemplary flow diagram of a method 230 for sharing content with a NFC-share group. The method 230 may be performed on a mobile station (e.g., MS 103a of FIG. 1) that is capable of NFC-based communication and that has one or more NFC-share group(s) pre-defined thereon.

The method 230 beings with step 231, in which the MS 103a receives a selection of content to be shared (e.g., a picture, video, contact or electronic business card, file, or the like) and a selection of a NFC-share group with which the content should be shared. The MS 103a may receive the selections from user input (e.g., in the form of user selections on a display screen of the MS 103a) or by any other appropriate means.

In response to receiving the selections, the MS 103a proceeds to step 233 in which the MS 103a establishes a near field communication link with a NFC-enabled device located in its close proximity. In step 233, the MS 103a transmits a request to establish a NFC link through the MS's NFC transceiver 113. If a NFC-enabled device is within NFC transmission range of the MS 103a, the transmitted request can be received by the device. Following the transmission of the request, the MS 103a waits for reception of a NFC link response message from a MS responding to the transmitted request (e.g., MS 103b). If and when a NFC link response message is received, the MS 103a can establish a near field communication link with the responding MS 103b and proceed to steps 235. If no NFC link response message is received within a timeout period, the MS 103a can either re-send the request to establish a NFC link, or the MS 103a can generate an error message for display to a user indicating that no NFC link could be established.

In step 235, the MS 103a determines whether the MS 103b with which a link was established in step 233 is a MS that is part of the NFC-share group selected in step 231. For this purpose, an NFC identifier received from the responding MS 103b can be compared to NFC identifiers associated with the selected NFC-share group in the memory of the MS 103a. If the received NFC identifier matches an identifier of the NFC-share group, control passes to step 239. However, if no match is located, the MS 103a issues an error notification in step 237 indicating that the linked device is not part of the selected NFC-share group, terminates the NFC link previously established in step 233, and returns to step 233 to attempt to establish a NFC link with a different NFC-enabled device that is part of the selected NFC-share group.

In step 239, the MS 103a transmits information regarding the selected content to be shared via the established NFC link to the responding MS 103b. Different information may be transmitted under different conditions, e.g.:

(a1) in some situations, the transmitted information may correspond to the content which was selected for sharing in step 231, such that the entire content is transmitted to the responding MS via the established NFC link. The entire content may be transmitted via the established NFC link when the content is of a small size (e.g., the content is a contact, an electronic business card, or the like) such that it can be transferred to the responding MS via NFC over a relatively short period of time (e.g., a period of no more than 1 minute); and/or (a2) in some situations, the transmitted information may correspond to information about the content which was selected for sharing in step 231, such that only the information about the content is transmitted to the responding MS via the established NFC link. In particular, the content itself may not be transmitted via the established NFC link. In general, the information about the content may include a link, URL, or address of a location from which the content can be downloaded and/or retrieved by the responding MS.

The information that is transmitted via the NFC link in step 239 can be determined based on a variety of factors. In some embodiments, the information according to (a1) may be sent by default; in other embodiments, the information according to (a2) may be sent by default. By way of example, the information according to (a1) may be transmitted if the amount of information is small (e.g., no more than 500 kilobytes), if the NFC link established in step 233 has low noise and/or is capable of sustaining a certain data transfer rate (e.g., the link can sustain a data transfer rate of at least 100 kilobits/second), or the like. Conversely, the information according to (a2) may be transmitted if the amount of information is large, if the NFC link has high noise and/or a low data transfer rate, or the like.

In response to receiving the transmitted information in step 239, the responding MS 103b may display a notification on the station's display screen indicating that content has been received (situation (a1)), or that content is available to be received (situation (a2)). The notification may provide a user of the responding MS 103b with an option to view and/or retrieve the content on the MS 103b.

Upon determining that the linked device is part of the NFC-share group in step 235, and/or upon sending the transmitted information to the responding MS in step 239, the MS 103a uploads the selected content to a NFC-share server 105 in step 241. The MS 103a uploads the selected content via the mobile communication network 101. In general, the content is uploaded for storage to a location corresponding to the link, URL, or address indicated in the information of situation (a2), above. The location to which the content is uploaded may be a location associated with the MS 103a having uploaded the content (e.g., a storage location associated with a NFC identifier for the MS 103a), a location associated with the particular NFC-share group that was selected in step 231, or one or more location(s) associated with the NFC identifiers of MSs that are part of the NFC-share group selected in step 231.

Finally, in step 243, the MS 103a causes a notification to be sent to the other mobile stations in the NFC-share group selected in step 231 (e.g., MSs 103c and 103d of FIG. 1). In particular, the MS 103a may cause the notification to be sent to all of the mobile stations associated with the NFC-share group except for the particular mobile station 103b with which the NFC link was established in step 233. The notification may be sent to the other stations in one of several ways:

(b1) in some situations, the notification may be sent by causing the MS 103a to send a mobile messaging service message to the other mobile stations in the NFC-share group. The message may include the content itself (if the content is of a type and/or size which can be sent using the messaging service), or the message can include information about the content such as a link, URL, or address of a location from which the content can be retrieved;

(b2) in some situations, the notification may be sent by causing the NFC-share server 105, or another appropriate server of network 101, to send a notification message to the other stations in the NFC-share group. The message may include substantially the same content as described in step (b1) above. The notification message may be a messaging service message, or another appropriate type of notification message sent to the other MSs. In some examples, the notification and/or content is sent to the other MSs using IP-based or packet-based transport;

(b3) in some situations, the NFC-share server 105 may push a notification and/or the uploaded content to each of the other MSs using an appropriate method for pushing content from a network server to a mobile station.

In situations (b1), (b2), and (b3) above, in cases in which the notification does not include the content itself, the notification may cause the other MSs to automatically download the content from the link, URL, or address included in the notification. For this purpose, the notification may include a command or other control information which, when received on a MS, causes the MS to retrieve data from a link, URL, or address identified in the notification. The notification may alternatively or additionally cause a notification to be displayed on each MS to provide a user of the MS, where the displayed notification includes an option to download the content to the MS.

Each MS that is associated with the NFC-share group is identified, in the NFC-share group data 119, by the mobile station's associated NFC identifier. In situations in which the NFC identifier is the MDN for each device, the notifications in situations (b1) and (b2) detailed above can be transmitted to each MS using the MDN for the corresponding station. However, in situations in which the NFC identifier is not the MDN, the NFC-share server 105 or another server accessible through mobile communication network 101 may maintain a database associating each mobile station's NFC identifier with a corresponding MDN and/or other address (e.g., an IP or other network address, or the like) used for communicating with the mobile station through the network 101. In such situations, the database may be consulted in order to retrieve, based on an NFC identifier retrieved from NFC-share group data 119, the corresponding MDN or other address for sending the notification and/or content to the mobile station. The database may be consulted by mobile stations, and/or by the NFC-share server, before sending notifications to the other mobile stations in the NFC-share group.

While the steps 239, 241, and 243 are shown in FIG. 2B as being performed in sequential order, the steps can be performed in a different order than the order presented, and/or some or all of the steps can be performed concurrently with other(s). In one example, steps 239, 241, and 243 are performed concurrently. In another example, step 241 is performed before steps 239 and 243.

The timing of the steps shown in FIG. 2B may also vary in different embodiments of the invention. In general, steps 231-243 are performed in order, and each step is performed once the previous step has been completed. As a result, step 239 may be performed in response to determining that the linked MS is one of the mobile stations of the selected NFC share group, and step 241 may be performed after establishing the NFC link between the mobile stations and/or in response to determining that the linked MS is one of the mobile stations of the selected NFC share group. In various examples, however, the timing of one or more steps may be determined based on a triggering event. A triggering event may include one or more of a user input or selection; completion of another step or function; expiration of a timer or delay; or the like. In one example, however, steps 241 and 243 are performed immediately upon determining that step 231 has been completed, regardless of whether steps 233, 235, and 239 have been completed. In the one example, steps 241 and/or 243 may thus be performed at the same time as one or more of steps 233, 235, and 239 are being performed. In another example, steps 241 and 243 are performed only upon determining that step 239 has been successfully completed. In the other example, the content may thus be shared with the other mobile stations in the NFC-share group only upon the content having been successfully shared with the NFC-linked mobile station. In a further example, certain steps are performed only upon receiving a user confirmation that the step should be performed. In the further example, each of steps 239, 241, and 243 may include prompting a user to proceed with the transmission (step 239), upload (step 241), and/or notification (step 243), and performing the step only upon receiving a response to each prompt from the user.

Figure 3:
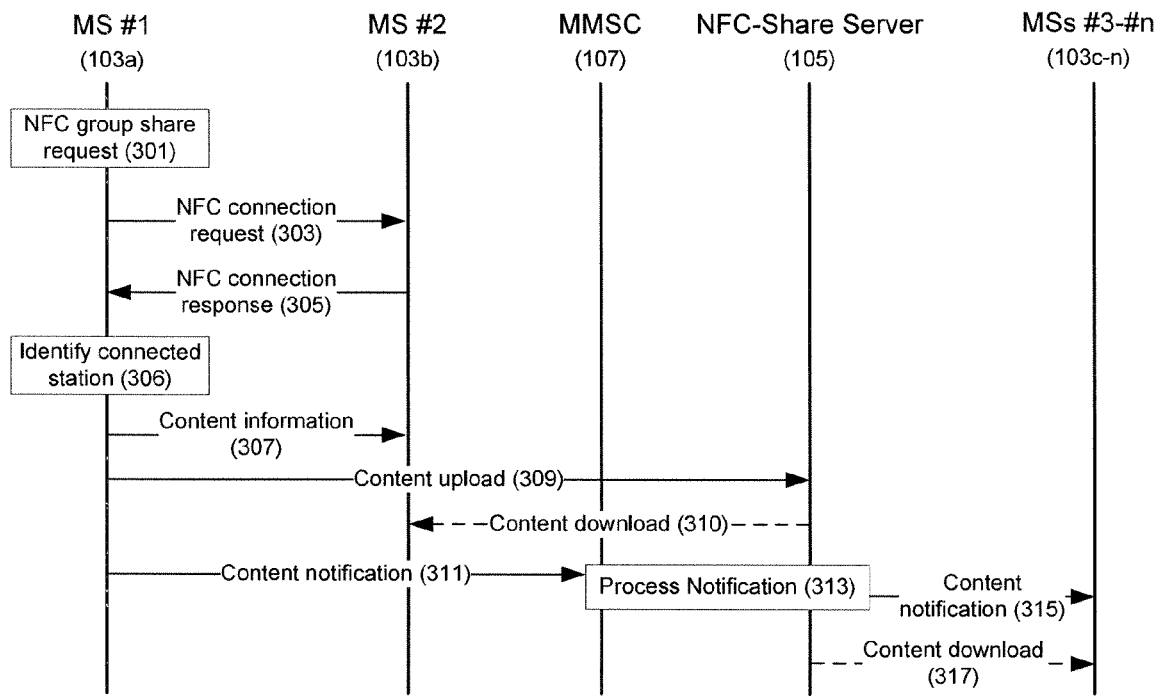
FIG. 3 is an exemplary signal flow diagram of signals used for sharing content from a MS with a NFC-share group.

FIG. 3 shows an exemplary diagram 300 showing signal flows used for sharing content with a NFC-share group. The diagram 300 shows signal flows that may occur in the course of implementing method 230 of FIG. 2B, for example.

The diagram begins at 301 with a first mobile station (MS #1, 103a) initiating a NFC group share operation. As in step 231 of method 230, the share operation may be initiated in response to receiving selections of content to be shared and of a NFC group with which to share the content. As part of initiating the share operation, the MS 103a begins operations for establishing a near field communication link with a MS of the selected NFC group. In particular, the MS 103a generates and sends a NFC connection request at 303 through the MS's NFC transceiver 113. The NFC transceiver 113 broadcasts a NFC connection request signal, including the MS's NFC identifier, for reception by any NFC-enabled devices that are within the transmission operating range of the MS's NFC transceiver. A NFC-enabled device (e.g., MS #2, 103b) may receive the NFC connection request, and in response to receiving and processing the connection request, may generate and transmit a NFC connection response from the MS's NFC transceiver at 305. In particular, the receiving station 103b may generate and transmit the response message if the device's security settings permit a connection to the MS 103a identified in the received NFC connection request. The NFC connection response includes a NFC identifier for the receiving device 103b.

While a single exchange of a connection request (303) and connection response (305) is shown in diagram 300, further communications may be exchanged between the MSs 103a and 103b in order to establish a near field communication link therebetween.

The MS 103a receives the NFC connection response transmitted by MS 103b, and processes the received response. In particular, at 306, the MS 103a retrieves the NFC identifier for the receiving device 103b from the response so as to identify the connected station. The MS 103a then determines whether the identified station corresponds to a NFC contact from the selected NFC share group. For this purpose, the MS 103a may compare the received NFC identifier with NFC identifiers in the NFC share group data 119, to determine whether the identifier matches any stored identifiers. If no match is located, the MS 103a determines that the connected MS 103b is not part of the selected NFC share group. The MS 103a may then terminate the NFC connection established with the MS 103b.

If a match is located, the MS 103a determines that the connected MS 103b is part of the selected NFC share group. The MS 103a then proceeds to 307. At 307, the MS 103a transmits information regarding the selected content to the connected MS 103b using the established NFC communication link. The transmitted information can include information about the content (e.g., information on the type of content, such as an image, video, contact, etc.; information on the sender of the content, such as a contact name; and/or a link, address, or URL from which the content can be retrieved), and/or the content itself. In response to receiving the transmitted information, the connected MS 103b displays a notification to a user indicating that content is available for retrieval or that content has been received on the mobile station.

If a match is located, the MS 103a can further proceed to 309. At 309, the MS 103a uploads the selected content to an NFC-share server 105. The content is uploaded to the NFC-share server 105 through the mobile communication network. Once uploaded, the content is available via the mobile communication network 101 for retrieval by the other MSs in the selected NFC-share group. In one example, the uploaded content includes an identifier for the MS 103a having uploaded the content, and the uploaded content is stored in the NFC-share server 105 in association with the identifier for the MS 103a. In another example, the uploaded content includes identifier(s) for the other MSs of the selected NFC share group (e.g., MSs 103c, 103d) with which the content should be shared, and the uploaded content is stored in the NFC-share server 105 in association with the identifier(s) for the other MSs. In another example, the uploaded content includes an identifier for the selected NFC share group, and is stored in the NFC-share server 105 in association with the identifier.

In examples, in which the content information transmitted to MS 103b at 307 does not include the content itself, the MS 103b may optionally retrieve and download the content from the NFC share server at 310. In particular, MS 103b may retrieve the content from a storage location of the NFC-share server that is associated with the MS 103a having uploaded the content, from a storage location associated with the MS 103b, or from a storage location associated with the NFC share group. The MS 103b may retrieve the content based on an identifier for the MS 103a or for the NFC share group that was received with the content information at 307.

In response to uploading the content to the NFC-share server 105, the MS 103a receives from the server 105 an upload response message confirming the successful upload of the content, and including a link, address, or URL from which the uploaded content can be retrieved from the server 105. The link, address, or URL can then be provided to MSs in the NFC-share group to enable the MSs to retrieve the content from the storage location in the server 105. The MS 103*a* proceeds to generate and transmit a content notification at 311, the content notification including information regarding the selected content (e.g., the information described in relation to step 307, above). The content notification can take several forms, as described below.

In a first example, the content notification can be sent by the MS 103*a* to each of the MSs in the selected NFC share group other than the MS with which the NFC link was established. For instance, the content notification can be sent by the MS 103*a* to each of the other MSs in the form of mobile messaging service (MMS) messages sent from the MS 103*a* to each of the other MSs. In the example, the content notification 311 can take the form of one or more MMS messages addressed to each of the other MSs and which are sent from the MS 103*a* to a mobile messaging service center (MMSC) 107. In turn, the MMSC optionally processes the MMS messages (at 313) so as to forward the MMS messages to each of the other MSs (at 315). In response to receiving the MMS message, each of the other MSs (e.g., MSs 103*c* and 103*d*) displays a notification to a user indicating that content is available for retrieval or that content has been received on the mobile station. If the MMS message does not include the content, each MS can optionally retrieve the content by downloading the content from the NFC-share server 105 at 317.

In a second example, the content notification can be sent by the MS 103*a* to the NFC-share server 105 (or other appropriate notification server) so as to cause the server 105 to send a notification message to each of the other MSs. In the example, the MS 103*a* thus sends a content notification identifying each of the other MSs to which the notification message should be sent, and including the link, address, or URL to the storage location of the content on the server 105. In response to receiving the content notification, the server 105 processes the received notification at 313, and generates and sends notification messages to each of the identified MSs at 315. The notifications can be transmitted from the server to the MSs are MMS messages (e.g., through MMSC 107), or as other types of notification messages addressed to the MSs. The messages can be sent to the NFC identifiers received in the content notification message received from the MS 103*a*, or the server 105 can retrieve from a database appropriate identifiers (e.g., MDNs) corresponding to each of the MSs identified in the content notification message. In response to receiving the message, each of the other MSs (e.g., MSs 103*c* and 103*d*) displays or otherwise conveys a notification to a user indicating that content is available for retrieval or that content has been received on the mobile station. If the message does not include the content, each MS can optionally retrieve the content by downloading the content from the NFC-share server 105 at 317 based on an address, link, or URL included in the content notification.

In a third example, the content notification can be sent by the MS 103*a* to the NFC-share server 105 (or other appropriate notification server) so as to cause the server 105 to push a notification and/or the uploaded content to each of the other MSs. In the example, the MS 103*a* thus sends a content notification identifying each of the other MSs to which the notification message should be pushed. In response to receiving the content notification, the server 105 processes the received notification at 313. In particular, based on the identity of each of the other MSs, the server 105 retrieves from a database an address (e.g., an IP address) associated with each of the MSs. The server 105 then generates a push message for each MS, and transmits the push message to the corresponding retrieved address. In the example, the push message can include instructions for the corresponding MS to retrieve the content from a link, URL, or address included in the message; alternatively, the push message can include the content itself.

The database of addresses used in the third example can be a database associating NFC identifiers with IP addresses of corresponding mobile stations. The database may require that each time a MS is assigned a new IP address, the newly assigned IP address be provided to the database. In some examples, each MS updates its record in the database to ensure that the database stores the newly assigned IP address; for this purpose, a NFC application running on each MS may update the database whenever the MS is assigned a new IP address. In other examples, systems of the mobile communication network 101 may keep updated records associating, which each MS, the IP address currently assigned to the MS.

In the method 230 and in the flow diagram 300, steps 239 and 307 have been described above as involving the MS 103*a* transmitting information regarding the selected content to be shared via the established NFC link to the responding MS 103*b*. In some examples, however, neither the information regarding selected content, nor the content itself may be transmitted to the MS 103*b* using NFC. Instead, the NFC link may be used to negotiate parameters for and establish a different type of direct mobile-station-to-mobile-station communication link. In turn the established direct mobile-station-to-mobile-station communication link may be used to transmit the selected content. In the examples, the mobile stations 103*a* and 103*b* may be equipped to communicate using Wi-Fi, Bluetooth, or other wireless communication standards that may be used to transmit the content from MS 103*a* to MS 103*b*. The NFC link established in steps 233 and/or 305 may thus be used to negotiate a handover to a Bluetooth-based or to a Wi-Fi based communication link between the mobile stations. Once the handover is complete, the MS 103*a* transmits the content to the MS 103*b* over the completed link. Bluetooth, Wi-Fi, or other wireless links may advantageously be used to transfer the content instead of NFC when these other wireless links have faster data transfer rates, lower noise sensitivity, and/or lower power requirements than alternative NFC links.

FIGS. 4A-4K show exemplary screens shots of various display screens which may be presented to a user of a mobile station during the course of implementing methods 200 or 230 on the mobile station. The screen shots will be described in relation to corresponding steps of methods 200 and 230, where applicable.

The NFC-related functionality on mobile stations 103 may be provided by an NFC application running on the mobile station. The NFC application may run on a processor of the mobile station 103, and may control the NFC transceiver 113 so as to monitor received near field communications for incoming requests, process received requests and display related notifications to users, and generate and send communications using NFC through the NFC transceiver 113. The NFC application may cause the display screens shown in FIGS. 4A-4K to be displayed on the mobile station.

Figure 4A:
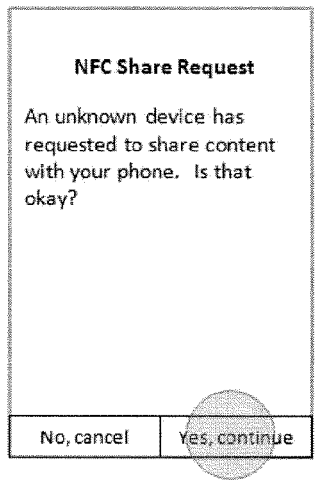
FIGS. 4A-4K are exemplary screens shots of various display screens which may be presented to a user of a MS during the course of implementing methods for adding a MS to a NFC share group, and for sharing content from a MS with a NFC-share group.

FIG. 4A shows a display screen that may be presented to a user of a MS (such as MS 103*b*, of FIG. 1) prompting the user whether or not to share content with another device (such as another MS, e.g. MS 103*a*). The display screen of FIG. 4A may be presented to a user, for example as part of steps 203 and/or 205 of method 200. In response to the prompt on the display screen, a user may select a "Yes, continue" option so as to enable content to be shared or received on the station. In response to selecting the "Yes, continue" option, the user may be presented with the display screen of FIG. 4B.

Figure 4B:
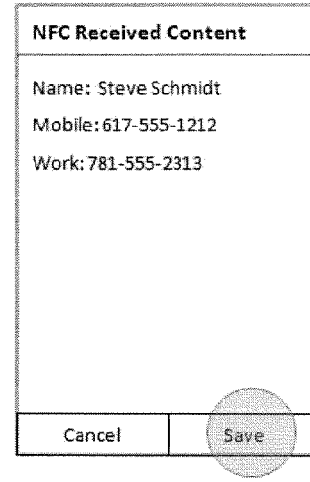

FIG. 4B shows a display screen presenting content received on a first MS over a near field communication link from a second MS. In the example shown, the received content is contact information which may include one or more of a name, phone number(s), and an NFC identifier. The display screen includes an option to save the received content for storage in a memory of the first MS, as may be presented to a user in step 205 of method 200.

Figure 4C:
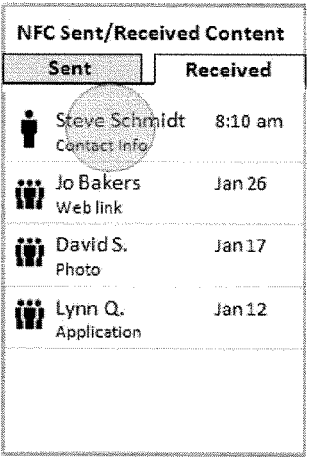

FIG. 4C shows a display screen presenting lists of content sent and/or received using near field communications from/to a MS. As shown, a "Received" tab has been selected such that only content received using NFC is presented. A user may select any of the items in the list so as to be presented with a menu of actions that can be taken with respect to the selected item. Such a menu is shown in FIG. 4D in which, in response to selecting one item of received content including contact information, a menu is presented including options to view, share, or delete the selected item of content; an option to add the contact associated with the selected item to a NFC-share group; and an option to block further communications to/from the contact associated with the selected item.

Figure 4D:
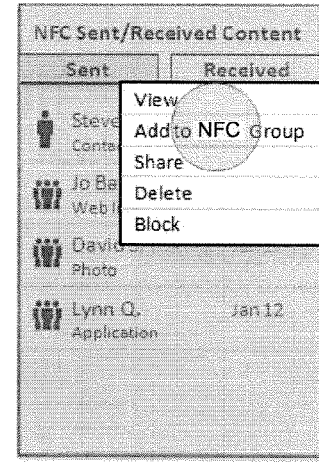
Figure 4E:
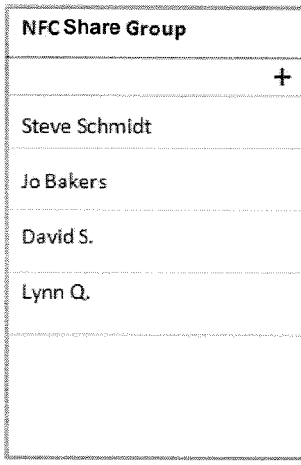

In response to selecting an option to "Add to NFC group" as shown in FIG. 4D, the display screen of FIG. 4E may be presented. FIG. 4E shows a display screen including a list of contacts that are associated with a NFC-share group on a mobile station.

Figure 4F:
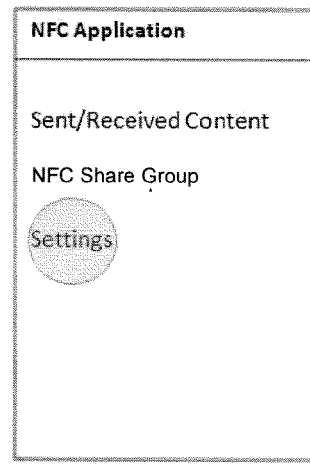

The NFC application may include several user selectable menus and options. FIG. 4F shows a display screen including several user options, including options to view content sent/received using NFC, to view contacts that form part of a NFC-share group, and to view NFC-related settings. In response to selecting the "Settings" option, a user may be presented with the display screen of FIG. 4G.

Figure 4G:
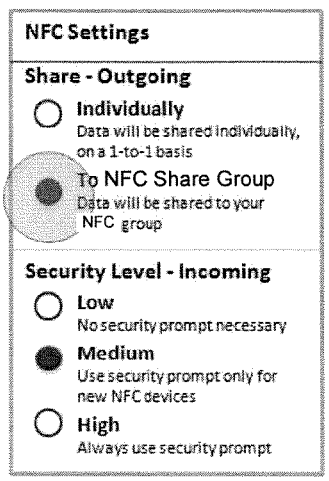

FIG. 4G shows a display screen presenting various NFC-related settings for selection by a user. Two different types of settings are considered. First, settings related to the sharing of outgoing content are provided: a first option enables the user to select that content to be shared from the MS and sent using NFC to other MSs (i.e., outgoing content) be shared individually, such that the selected content is only shared with individual contacts or devices on a one-to-one basis; a second option enables the user to select that outgoing content have the option to be shared with groups of contacts, such as with NFC-share groups as described herein. Second, settings are provided which are related to the security level applied to connection requests and content received using NFC on the MS (i.e., incoming content). Three options are provided: selection of a low security option causes the MS to automatically accept incoming requests or content without presenting a prompt to a user, such that all content sent to the MS using NFC will be received on the MS; selection of a medium security option causes the MS to automatically accept incoming requests and content received from authorized devices (such as devices which have previously been authorized on the MS) and to present a prompt only for requests and content received from new NFC devices with which communications have not previously taken place; and selection of a high security option causes the MS to always display a security prompt (such as the prompt of FIG. 4A) to request user authorization when incoming requests or content is received on the MS.

Figure 4H:
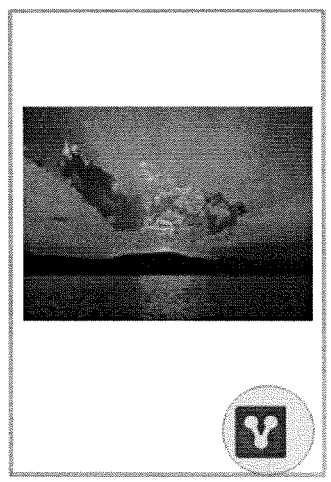
Figure 4I:
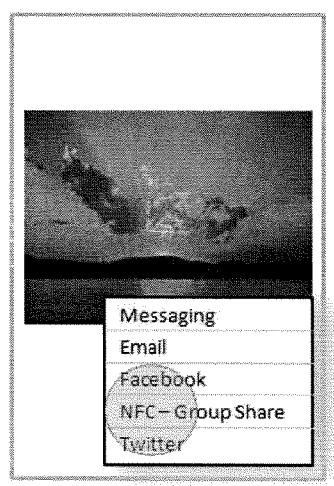

FIGS. 4H-4K show display screens as may be presented to a user of a MS as part of an implementation of method 230. FIG. 4H shows a display screen presenting an item of content (e.g., an image) on a screen of a mobile device. The display screen includes a sharing icon for user selection. In response to a user selecting the sharing icon, a menu of sharing options relating to the displayed content (i.e., the image) may be presented to a user. FIG. 4I shows the menu of sharing options, which includes options to share the content using messaging, email, Facebook or social networking, NFC group share, or twitter. If a user selects the "NFC-Group Share" menu option, the selected content is shared using NFC in accordance with the method 230. In particular, the MS will attempt to establish a NFC communication link with a mobile station that is part of the NFC-share group and, upon establishment of the link, the MS will share the content with all MSs that are part of the selected group.

Figure 4J:
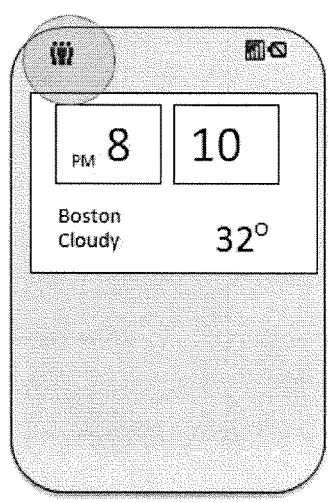
Figure 4K:
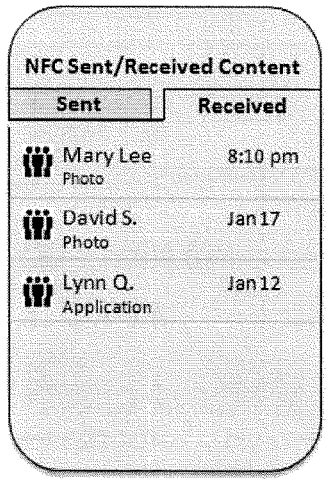

FIG. 4J shows a notification icon which may be displayed on a receiving MS upon receiving a notification regarding content received through NFC group sharing. This notification icon may be unique from other icons that indicate reception of non-NFC-share group content. In FIG. 4J, the exemplary icon is displayed in the top-left corner of a home screen. If a user selects the notification icon of FIG. 4J, the display screen shown in FIG. 4K is presented on the MS. The display screen of FIG. 4K shows a list of content received using NFC and/or NFC group sharing, including the received content which caused the notification icon to be displayed in FIG. 4J. The user can select from the list of content any received content for retrieval and display.

In some examples, the NFC contact information associated with a NFC-share group on a mobile station can include user preference information for each mobile station forming part of the NFC-share group. The user preference information may be received with the NFC contact information or with the additional received contact information associated with a new contact and described in relation to steps 205 and 207 above. The user preference information can include, for the associated mobile station, a setting indicative of whether a user of the mobile station opts out of receiving one or more types of content. A sending MS (e.g., MS 103a in the example of method 230) may thus, prior to transmitting content information (e.g., step 239) or causing a notification to be sent to other MSs (e.g., step 243), identify the type of content selected in step 231, determine whether one or more mobile stations in the selected NFC-share group have opted out of receiving the identified type of content, and transmit the content or cause the notification to be sent only to MSs of the NFC-share group that have not opted out of receiving the identified type of content. In one example, a user of a MS 103b may thus opt out of receiving videos, even if the user of the MS 103b does not opt out of receiving contacts, images, or other types of shared content. If a video is selected to be shared from a MS 103a with a NFC-share group including the MS 103b, the MS 103a may determine that the MS 103b has opted out of receiving video content, and the video (and/or related content information) may not be transmitted from the MS 103a to the MS 103b as part of a NFC-share operation.

Figure 5:
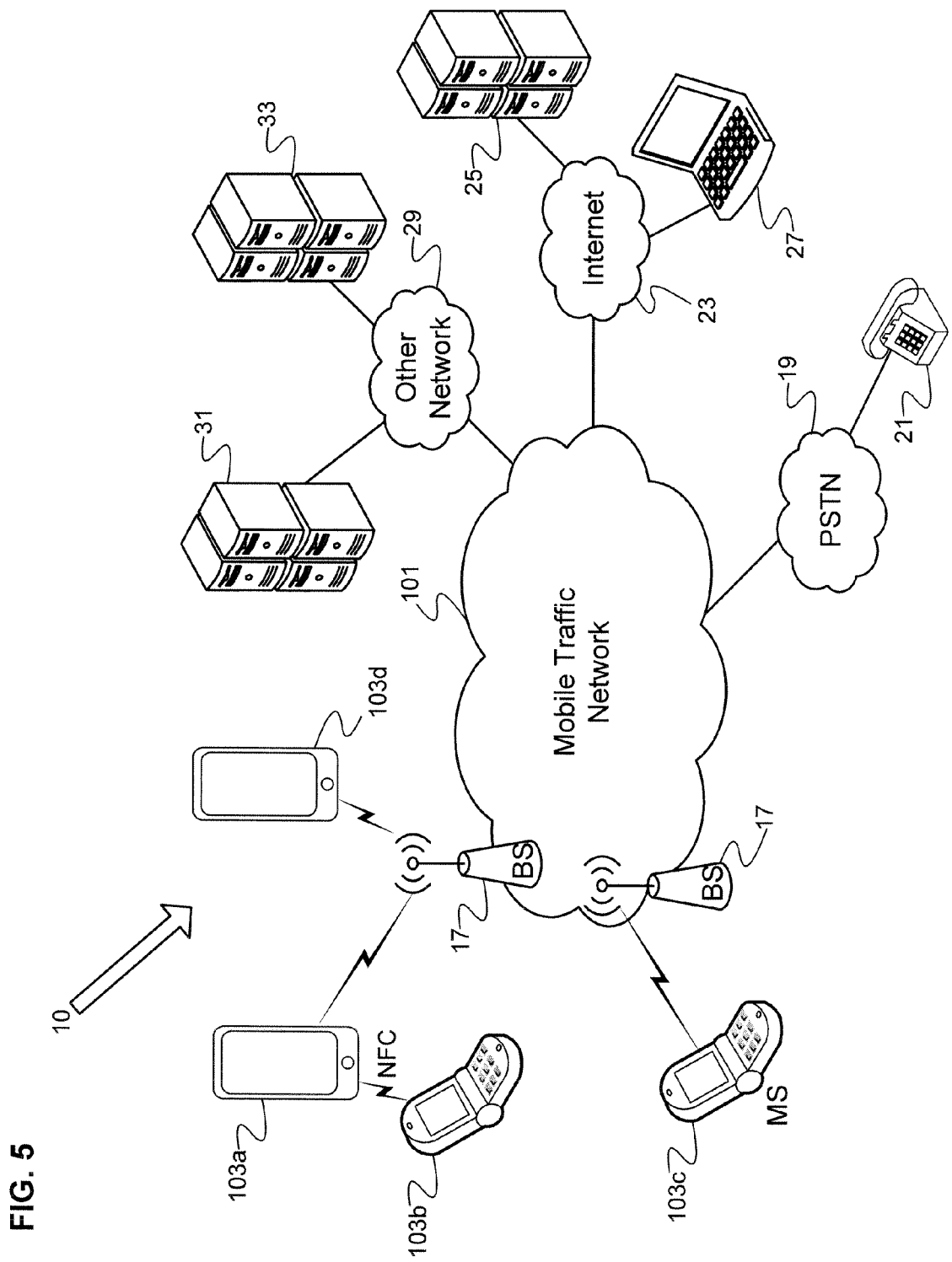
FIG. 5 is a high-level functional block diagram of an example of a system of networks/devices that provide various communications for mobile stations and support an example of the NFC-based group sharing service.

FIG. 5 illustrates a system 10 offering a variety of mobile communication services, including communications for NFC-based group sharing of content by mobile station users. The example shows four mobile stations (MSs) 103a, 103b, 103c, and 103d, as well as a mobile communication network 101. The stations 103a-d are examples of mobile stations that may be used for the NFC-based group sharing service. However, the network will provide similar communications for many other similar users as well as for mobile devices/users that do not participate in NFC-based services. The network 101 provides mobile wireless communications services to those stations as well as to other mobile stations (not shown), for example, via a number of base stations (BSs) 17. The present techniques may be implemented in any of a variety of available mobile networks 101 and/or on any type of mobile station compatible with such a network 101, and the drawing shows only a very simplified example of a few relevant elements of the network 101 for purposes of discussion here.

The wireless mobile communication network 101 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 103 are capable of voice telephone communications through the network 101, and for the NFC-based group sharing services, the exemplary devices 103*a-d* are capable of data communications through the particular type of network 101 (and the users thereof typically will have subscribed to data service through the network).

The network 101 allows users of the mobile stations such as 103*a-d* (and other mobile stations not shown) to initiate and receive telephone calls to each other as well as through the public switched telephone network (PSTN) 19 and telephone stations 21 connected to the PSTN. The network 101 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 103 via the Internet 23 may be with devices like those shown at 25 and 27 as well as with a variety of other types of devices or systems capable of data communications through various interconnected networks. The mobile stations 103*a-d* of users of the NFC-based group sharing service also can receive and execute applications written in various programming languages, as discussed more later.

Mobile stations 103 can take the form of portable handsets, smart-phones or personal digital assistants, although they may be implemented in other form factors. Program applications, including an application to assist in the NFC-based group sharing service can be configured to execute on many different types of mobile stations 103. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 101 can be implemented by a number of interconnected networks. Hence, the overall network 101 may include a number of radio access networks (RANs), as well as regional ground networks interconnecting a number of RANs and a wide area network (WAN) interconnecting the regional ground networks to core network elements. A regional portion of the network 10, such as that serving mobile stations 103*a-d*, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 103, when the mobile stations are within range. Each base station can include a BTS coupled to several antennae mounted on a radio tower within a coverage area often referred to as a "cell." The BTS is the part of the radio network that sends and receives RF signals to/from the mobile stations 103 that are served by the base station 17.

The radio access networks can also include a traffic network represented generally by the cloud at 101, which carries the user communications and data for the mobile stations 103 between the base stations 17 and other elements with or through which the mobile stations communicate. The network can also include other elements that support functionality other than device-to-device media transfer services such as messaging service messages and voice communications. Specific elements of the network 101 for carrying the voice and data traffic and for controlling various aspects of the calls or sessions through the network 101 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. The application servers 31 can include one or more NFC-share servers 105.

A mobile station 103 communicates over the air with a base station 17 and through the traffic network 101 for various voice and data communications, e.g. through the Internet 23 with a server 25 and/or with application servers 31. If the mobile service carrier offers the NFC-based group sharing service, the service may be hosted on a carrier operated application server 105 such as server 31, for communication via the networks 101 and 29. Alternatively, the NFC-based group sharing service may be provided by a separate entity (alone or through agreements with the carrier), in which case, the service may be hosted on an application server such as server 25 connected for communication via the networks 101 and 23. Servers such as 25 and 31 may provide any of a variety of common application or service functions in support of or in addition to an application program running on the mobile station 103. However, for purposes of further discussion, we will focus on functions thereof in support of the mobile NFC-based group sharing service. For a given service, including the NFC-based group sharing service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 103, the server application provides appropriate information to the authentication server 33 to allow server application 33 to authenticate the mobile station 103 as outlined herein. Upon successful authentication, the server 33 informs the server application 31, which in turn provides access to the service via data communication through the various communication elements (e.g. 29, 101 and 17) of the network 10. A similar authentication function may be provided for NFC-based group sharing service(s) offered via the server 25, either by the server 33 if there is an appropriate arrangement between the carrier and the operator of server 24, by a program on the server 25 or via a separate authentication server (not shown) connected to the Internet 23.

The NFC-based group sharing service under consideration here may be delivered to touch screen type mobile stations as well as to non-touch type mobile stations. Hence, our simple example shows the mobile stations (MSs) 103b and 103c as non-touch type mobile stations and shows the mobile stations (MSs) 103a and 103d as touch screen type mobile stations. Implementation of the NFC-based group sharing service will involve at least some execution of programming in the mobile stations as well as implementation of user input/output functions and data communications through the network 101, from the mobile stations.

Those skilled in the art presumably are familiar with the structure, programming and operations of the various types of mobile stations. However, for completeness, it may be useful to consider the functional elements/aspects of an exemplary mobile station 103, at a high-level.

Figure 6:
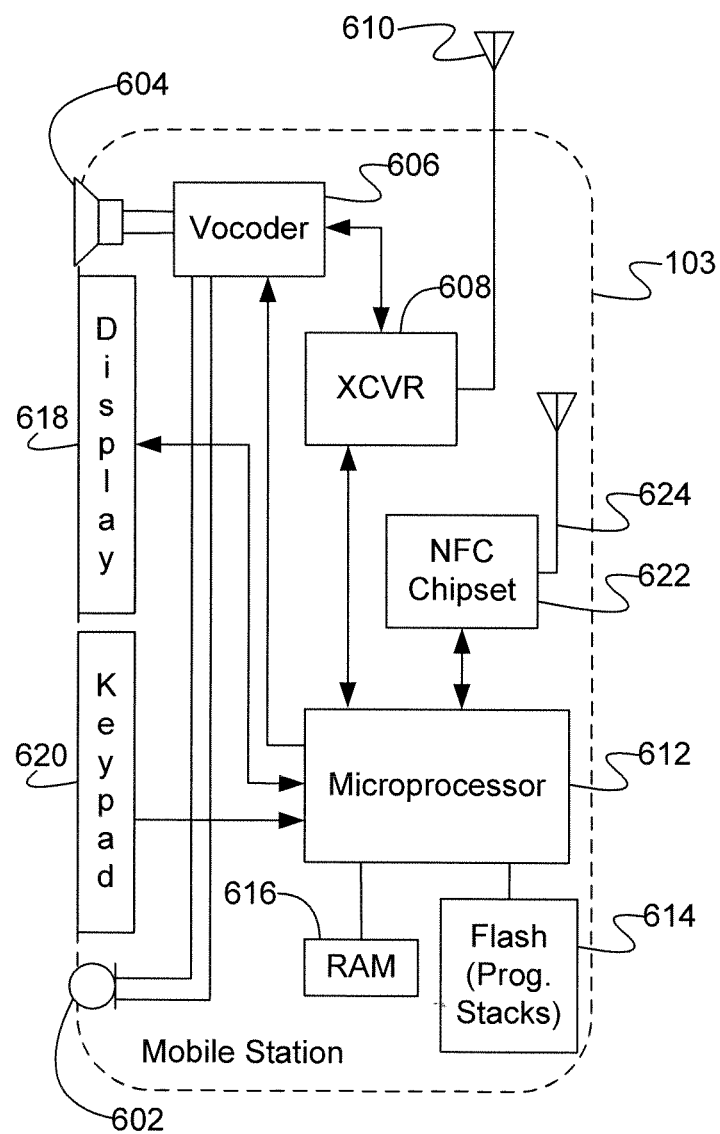
FIG. 6 is a high-level functional block diagram of an exemplary NFC-enabled mobile station as may utilize the NFC-based group sharing service through a network/system like that shown in FIGS. 1 and 5.

For purposes of such a discussion, FIG. 6 provides a block diagram illustration of an exemplary mobile station 103. Although the mobile station 103 may be a smart-phone or may be incorporated into another device, such as a personal digital assistant (PDA) or the like, for discussion purposes, the illustration shows the mobile station 103 in the form of a handset. The handset embodiment of the mobile station 103 functions as a normal digital wireless telephone station. For that function, the station 103 includes a microphone 602 for audio signal input and a speaker 604 for audio signal output. The microphone 602 and speaker 604 connect to voice coding and decoding circuitry (vocoder) 606.

For digital wireless communications, the handset 103 also includes at least one digital transceiver (XCVR) 608. Today, the handset 103 would be configured for digital wireless communications using one or more of the common network technology types. The concepts discussed here encompass embodiments of the mobile station 103 utilizing any digital transceivers that conform to current or future developed digital wireless communication standards. The mobile station 103 may also be capable of analog operation via a legacy network technology.

The transceiver 608 provides two-way wireless communication of information, such as vocoded speech samples and/or digital information, in accordance with the technology of the network 101. The transceiver 608 also sends and receives a variety of signaling messages in support of the various voice and data services provided via the mobile station 103a and the communication network. Each transceiver 608 connects through RF send and receive amplifiers (not separately shown) to an antenna 610. The transceiver may also support various types of mobile messaging services (MMS), such as short message service (SMS), enhanced messaging service (EMS) and/or multimedia messaging service.

The mobile station 103 also includes a near field communication (NFC) chipset 622, which includes a NFC transceiver. The NFC chipset 622 provides two-way wireless communication of information in accordance with NFC technology and protocols. The NFC chipset 622 also sends and receives a variety of signaling messages for establishing NFC links with other NFC-enabled devices, and is further configured to support NFC-based group sharing of content. The NFC chipset 622 is connected to a NFC antenna 624, which is used for transmitting and receiving NFC communications to/from other mobile stations.

The mobile station 103 includes a display 618 for displaying messages, menus or the like, call related information dialed by the user, calling party numbers, etc., including display screens and menus such as those shown in FIGS. 4A-4K for the NFC-based group sharing service. A keypad 620 enables dialing digits for voice and/or data calls as well as generating selection inputs, for example, as may be keyed-in by the user based on a displayed menu or as a cursor control and selection of a highlighted item on a displayed screen. The display 618 and keypad 620 are the physical elements providing a textual or graphical user interface. Various combinations of the keypad 620, display 618, microphone 602 and speaker 604 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during NFC-based group sharing.

A microprocessor 612 serves as a programmable controller for the mobile station 103, in that it controls all operations of the mobile station 103 in accord with programming that it executes, for all normal operations, and for operations involved in the NFC-based group sharing procedure under consideration here. In particular, the microprocessor 612 controls the operations of the NFC chipset 622 to implement the methods and provide the NFC communications and links described herein. In the example, the mobile station 103 includes flash type program memory 614, for storage of various "software" or "firmware" program routines and mobile configuration settings, such as mobile directory number (MDN) and/or mobile identification number (MIN), etc. The mobile station 103 may also include a non-volatile random access memory (RAM) 616 for a working data processing memory. Of course, other storage devices or configurations may be added to or substituted for those in the example. In a present implementation, the flash type program memory 614 stores firmware such as a boot routine, device driver software, an operating system, call processing software and vocoder control software, and any of a wide variety of other applications, such as client browser software and short message service software. The memories 614, 616 also store various data, such as telephone numbers, server addresses, and NFC identifiers, downloaded data such as multimedia content, sent and/or received NFC data, and various data input by the user. Programming stored in the flash type program memory 614, sometimes referred to as "firmware," is loaded into and executed by the microprocessor 612. The programming configures the microprocessor so that the mobile station is capable of performing various desired functions, including in this case the functions involved in the technique for providing NFC-based group sharing.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
    in response to establishing a near-field communication link between one mobile station and another mobile station, comparing by the one mobile station a near-field communication identifier received via the established near-field communication link from the other mobile station to near-field communication identifiers associated with mobile stations of a pre-defined near-field communication sharing group selected from a memory of the one mobile station for receipt of content to be shared by the one mobile station;
    in response to results of the comparison, determining that the other mobile station is one of the plurality of mobile stations of the pre-defined near-field communication sharing group;
    based on the determination that the other mobile station is in the pre-defined near-field communication sharing group, transmitting information regarding content to be shared, from the one mobile station to the other mobile station via the established near-field communication link, wherein the information regarding content to be shared comprises a link to the content to be shared to enable downloading of the content;
    uploading the content to be shared from the one mobile station to a server via a mobile communication network, to make the uploaded content to be shared available via the mobile communication network; and
    causing a notification to retrieve the uploaded content from the server to be sent to at least one additional mobile station of the pre-defined near field communication sharing group other than the other mobile station, but not to the other mobile station,
    wherein the one mobile station, when communicating with the other mobile station via the established near-field communication link, cannot establish a near field communication link with the at least one additional mobile station of the pre-defined near-field communication sharing group.

2. The method of claim 1, wherein the transmitting step comprises transmitting the content to be shared from the one mobile station to the other mobile station via the established near-field communication link.

3. The method of claim 1, wherein the notification message includes information to enable the at least one additional mobile station to retrieve the uploaded content to be shared from the server via the mobile communication network.

4. The method of claim 3, wherein the notification message is a mobile messaging service message.

5. The method of claim 1, further comprising transmitting a notification message from the one mobile station to the server via the mobile communication network,
    wherein the notification message includes identification of the at least one additional mobile station of the pre-defined sharing group other than the other mobile station, and
    wherein the notification message includes an instruction for configuring the server to notify each of the identified at least one additional mobile station of the pre-defined sharing group other than the other mobile station about the uploaded content to be shared from the server.

6. The method of claim 5, wherein the notification message includes an instruction for configuring the server to send a mobile messaging service message to each of the identified at least one additional mobile station of the pre-defined sharing group about the uploaded content.

7. The method of claim 1, wherein the content to be shared is uploaded to the server in response to determining that the other mobile station is one of the mobile stations of the pre-defined sharing group.

8. The method of claim 1, wherein the step of uploading the content to be shared from the one mobile station to the server is performed only after transmitting the information regarding content to be shared to the other mobile station via the near-field communication.

9. The method of claim 1, wherein the step of determining that the other mobile station is one of the plurality of mobile stations of the pre-defined sharing group comprises:
determining that the other mobile station is one of the plurality of mobile stations of the pre-defined sharing group upon locating a match between the received near-field communication identifier and at least one near-field communication identifier for mobile stations associated with the pre-defined near-field communication sharing group.

10. The method of claim 1, further comprising steps of:
prior to comparing by the one mobile station, receiving from the other mobile station the near-field communication identifier of the other mobile station for uniquely identifying the other mobile station for near-field communication; and
associating the near-field communication identifier for uniquely identifying the other mobile station for near-field communication with the pre-defined near-field communication sharing group, in response to receiving a user instruction to add the other mobile station to the pre-defined near-field communication sharing group.

11. The method of claim 1, wherein the transmitted information regarding content to be shared includes the content, and transmitting information comprises:
transmitting the content to be shared in a relatively short period of time and via the established near-field communication link to the other mobile device.

12. The method of claim 1, wherein the transmitted information regarding content to be shared includes a link, uniform resource locator, or allocation address from which the content is to be retrieved in response to the transmitted information being a large amount of information or the established near-field communication link having a low data transfer rate.

13. A mobile station, comprising:
a transceiver configured to provide communication of the mobile station through a mobile communication network;
a near field communication transceiver;
a processor coupled to the transceivers;
at least one memory accessible by the processor, configured to store content; and programming stored in the memory, wherein execution of the programming by the processor configures the mobile station to perform functions including functions to:
in response to establishing a near-field communication link between the mobile station and another mobile station, compare by the mobile station a near-field communication identifier received via the established near-field communication link from the other mobile station to near-field communication identifiers associated with a pre-defined near-field communication sharing group selected for receipt of content to be shared by the one mobile station;
in response to results of the comparison, determine that the other mobile station is one of the plurality of mobile stations in the pre-defined near-field communication sharing group;
based on the determination that the other mobile station is in the pre-defined near-field communication sharing group, transmit information regarding content to be shared, from the mobile station to the other mobile station via the established near-field communication link, wherein the information regarding content to be shared comprises a link to the content to be shared to enable downloading of the content;
upload the content to be shared from the mobile station to a server via the mobile communication network, to make the uploaded content to be shared available via the mobile communication network; and
cause a notification to retrieve the content from the server to be sent to at least one additional mobile station of the pre-defined near-field communication sharing group other than the other mobile station, but not to the other mobile station,
wherein the one mobile station, when communicating with the other mobile station via the established near-field communication link, cannot establish a near field communication link with the at least one additional mobile station of the pre-defined near-field communication sharing group.

14. The mobile station of claim 13, wherein the function to transmit comprises a function to transmit the content to be shared from the mobile station to the other mobile station via the established near-field communication link.

15. The mobile station of claim 13, wherein the notification message includes information to enable the at least one additional mobile station to retrieve the uploaded content to be shared from the server via the mobile communication network.

16. The mobile station of claim 15, wherein the notification message is a mobile messaging service message.

17. The mobile station of claim 13, further comprising a function to transmit a notification message from the mobile station to the server via the mobile communication network,
wherein the notification message includes identification of at least one additional mobile station of the pre-defined sharing group other than the other mobile station, and
wherein the notification message includes an instruction for configuring the server to notify each of the identified at least one additional mobile station of the pre-defined sharing group other than the other mobile station about the uploaded content to be shared from the server.

18. The mobile station of claim 17, wherein the notification message includes an instruction for configuring the server to send a mobile messaging service message to each of the identified at least one mobile station of the pre-defined sharing group about the uploaded content.

19. The mobile station of claim 13, wherein the function of uploading the content to be shared to the server is performed in response to determining that the other mobile station is one of the mobile stations of the pre-defined sharing group.

20. The mobile station of claim 13, wherein the function of uploading the content to be shared to the server is performed only after transmitting the information regarding content to be shared to the other mobile station via the near-field communication.

21. The mobile station of claim 13, wherein the function to determine in response to the result of the comparison that the other mobile station is one of the plurality of mobile stations of the pre-defined sharing group comprises functions to:
determine that the other mobile station is one of the plurality of mobile stations of the pre-defined sharing group upon locating a match between the received identifier and at least one identifier for mobile stations associated with the pre-defined near-field communication sharing group.

22. The mobile station of claim 13, wherein the programming further configures the mobile station to perform functions including functions to:

prior to the comparison by the one mobile station, receive from the other mobile station the near-field communication identifier of the other mobile station for uniquely identifying the other mobile station for near-field communication; and associate the identifier for uniquely identifying the other mobile station for near-field communication with the pre-defined near-field communication sharing group, in response to receiving a user instruction to add the other mobile station to the pre-defined near-field communication group.

* * * * *